US008955315B2

(12) United States Patent
Yen et al.

(10) Patent No.: US 8,955,315 B2
(45) Date of Patent: Feb. 17, 2015

(54) HYDROELECTRIC GENERATOR

(75) Inventors: Chih-Wei Yen, Hsinchu (TW); Yi-Chen Li, Hsinchu County (TW); Tzu-Hung Huang, Kaohsiung (TW); Yin-Ling Kuo, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 613 days.

(21) Appl. No.: 13/241,782

(22) Filed: Sep. 23, 2011

(65) Prior Publication Data

US 2012/0248778 A1  Oct. 4, 2012

(30) Foreign Application Priority Data

Mar. 30, 2011  (TW) ............................. 100111136 A (51) Int. Cl.
*F16D 31/02* (2006.01)
*F03D 3/00* (2006.01)
(Continued)

(52) U.S. Cl.
CPC ......... *F03B 13/264* (2013.01); *F05B 2240/133* (2013.01); *F05B 2240/97* (2013.01); *Y02E 10/38* (2013.01); *Y02E 10/28* (2013.01); *Y10S 415/914* (2013.01)
USPC ............ 60/398; 415/58.5; 415/58.7; 415/914

(58) Field of Classification Search
CPC ................................ Y02E 10/38; Y02E 10/20
USPC .................. 415/914, 58.4–58.7; 60/398, 325
See application file for complete search history.

(56) References Cited

U.S. PATENT DOCUMENTS

| 958,705 | A | * | 5/1910 | Mesta | 417/456 |
| 1,301,209 | A | * | 4/1919 | Worden | 417/258 |
| 1,730,748 | A | * | 10/1929 | Schmidt | 415/144 |

(Continued)

FOREIGN PATENT DOCUMENTS

| CN | 101008372 A | 8/2007 |
| CN | 101319648 | 12/2008 |

(Continued)

OTHER PUBLICATIONS

Khan, et al., "Hydrokinetic Energy Conversion Systems and Assessment of Horizontal and Vertical Axis Turbines for River and Tidal Applications: A Technology Status Review", Applied Energy, (2009), pp. 1823-1835, vol. 86.

(Continued)

*Primary Examiner* — Edward Look
*Assistant Examiner* — Daniel Collins
(74) *Attorney, Agent, or Firm* — Muncy, Geissler, Olds & Lowe, P.C.

(57) ABSTRACT

A hydroelectric generator includes a body and an electromechanical apparatus cabin. The body has a tube penetrating the body and a first flow channel. The tube has a tapering segment and a throat portion communicating with the first tapering segment. One end portion of the first flow channel is located on a wall surface of the throat portion, so that the first flow channel communicates with the tube. The first flow channel is used to enable a fluid to flow into the tube from the first flow channel or guide a fluid to flow out of the body from the throat portion. The electromechanical apparatus cabin has an energy retrieving apparatus disposed in the throat portion of the tube, and the end portion of the first flow channel communicating with the tube is located at a front side or a back side of the energy retrieving apparatus.

5 Claims, 9 Drawing Sheets

(51) Int. Cl.
*F03D 11/00* (2006.01)
*F03B 13/26* (2006.01)

(56) References Cited

U.S. PATENT DOCUMENTS

| | | | | |
|---|---|---|---|---|
| 2,084,462 | A | * | 6/1937 | Stalker .......................... 415/115 |
| 4,207,741 | A | * | 6/1980 | Rainey ............................ 60/496 |
| 4,297,083 | A | * | 10/1981 | von Petery ...................... 417/53 |
| 2003/0193197 | A1 | | 10/2003 | Hibbs et al. |
| 2005/0001432 | A1 | | 1/2005 | Drentham Susman et al. |
| 2008/0001410 | A1 | * | 1/2008 | Welch, Jr. ........................ 290/53 |
| 2010/0066089 | A1 | * | 3/2010 | Best et al. ....................... 290/52 |

FOREIGN PATENT DOCUMENTS

| | | |
|---|---|---|
| CN | 101576048 | 11/2009 |
| CN | 101666284 A | 3/2010 |
| WO | WO-2007/045853 A1 | 4/2007 |

OTHER PUBLICATIONS

Watson, et al., "Modelling of the Performance of a Building-Mounted Ducted Wind Turbine", Journal of Physics, (2007), 012001, vol. 75.

Wang, et al., "Analysis of a Novel Autonomous Marine Hybrid Power Generation/Energy Storage System with a High-Voltage Direct Current Link", Journal of Power Sources, (2008), pp. 1284-1292, vol. 185.

Furukawa, et al., "Development of Ducted Darrieus Turbine for Low Head Hydropower Utilization" Current Applied Physics, (2010) pp. S128-S132, vol. 10.

Mahmoud Alidadi, "Duct Optimization for a Ducted Vertical Axis Hydro Current Turbine", Thesis for the University of British Columbia, (Jun. 2009).

* cited by examiner

HYDROELECTRIC GENERATOR

CROSS-REFERENCE TO RELATED APPLICATIONS

This non-provisional application claims priority under 35 U.S.C. §119(a) on Patent Application No(s). 100111136 filed in Taiwan, R.O.C. on Mar. 30, 2011, the entire contents of which are hereby incorporated by reference.

BACKGROUND

1. Technical Field

The disclosure relates to generators, and more particularly to hydroelectric generators.

2. Related Art

Conventional electric power generation may be roughly classified into hydroelectricity generation, thermoelectricity generation, and nuclear electricity generation. With respect to the hydroelectricity generation, in order to generate electrical energy, a generator is driven by taking advantage of the water level difference from nature water resources. However, for such hydroelectricity generation, a large reservoir is needed to generate electrical energy with an economic scale. Moreover, the construction cost of the large reservoir is high, and the large reservoir greatly damages the natural landscape and ecological environment.

With respect to the thermoelectricity generation, thermal energy is converted into electrical energy by burning fuel. However, the thermoelectricity generation consumes a large quantity of mineral resources, since the fuel in the current thermoelectricity generation comes from coal or petroleum. The global coal and petroleum deposits are limited, so the cost of the current thermoelectricity generation is rapidly increased with the decrease of the global coal and petroleum deposits. Moreover, during the thermoelectricity generation, fuel burning generates a lot of carbon dioxide. Therefore, the thermoelectricity generation also furthers the damage of the greenhouse effect to the earth.

Furthermore, nowadays, the nuclear electricity generation gradually substitutes for both the hydroelectricity generation and the thermoelectricity generation, and becomes the mainstream of power generation. However, radiation is a problem need to be considered. Moreover, hot waste water and nuclear waste generated in the nuclear electricity generation also greatly damage natural ecology.

Therefore, today, green energy resources are sought, and the possibility of converting the energy of the ocean into electrical energy is studied. For example, the temperature difference between the surface layer and the bottom layer of the ocean, tide change, waves, and ocean currents contain a lot of energy. Since all the energy comes from the ocean, and the ocean is not damaged during the conversion of the energy of the ocean into the electrical energy, such technology of generating electricity becomes a research focus. However, in the current technique, the conversion efficiency of converting the energy of the ocean into the electrical energy is low. Therefore, it is an urgent need to increase the conversion efficiency.

SUMMARY

In view of the above problem, the present disclosure provides a hydroelectric generator having high electricity generating efficiency.

In one embodiment, the hydroelectric generator comprises a body and an electromechanical apparatus cabin. The body comprises a tube passing through the body and a first flow channel. The tube comprises a first tapering segment having a sectional area tapering from the outside of the tube to the inside of the tube and a throat portion. The throat portion communicates with the end of the first tapering segment having a smaller sectional area. One end of the first flow channel is located on a wall surface of the throat portion, so that the first flow channel communicates with the tube. The first flow channel is used to guide fluid to flow into the tube or to flow out of the body from the throat portion. The electromechanical apparatus cabin comprises an energy retrieving apparatus disposed in the throat portion of the tube. The end portion of the first flow channel communicating with the tube is located in front or back of the energy retrieving apparatus.

Based on the above embodiment, the seawater can be poured into the upstream region of the throat portion or the seawater in the downstream region of the throat portion can be sucked out of the throat portion so, compared with the prior art, the electricity generating efficiency of the hydroelectric generator in the embodiment is enhanced.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
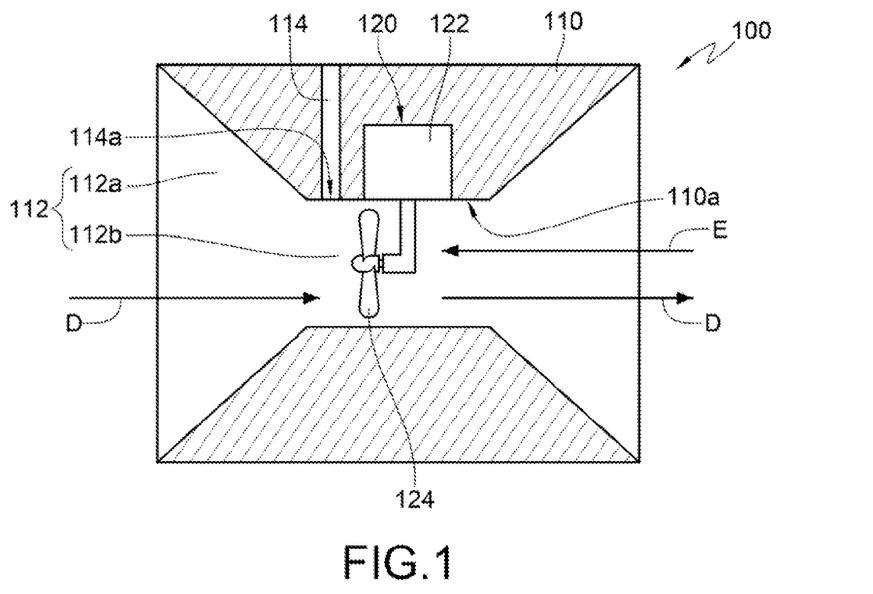
FIG. 1 is a schematic sectional view of an embodiment of a hydroelectric generator.

FIG. 1 is a schematic sectional view of an embodiment of a hydroelectric generator. Referring to FIG. 1, the hydroelectric generator 100 comprises a body 110 and an electromechanical apparatus cabin 120. The body 110 has a tube 112 penetrating the body 110 and a first flow channel 114. The tube 112 has a first tapering segment 112a having a sectional area tapering from the outside of the tube 112 to the inside of the tube 112 and a throat portion 112b. The throat portion 112b communicates with the end of the first tapering segment 112a having a smaller sectional area. One end portion 114a of the first flow channel 114 is located on a wall surface 110a forming the throat portion 112b, so that the first flow channel 114 communicates with the throat portion 112b of the tube 112. The electromechanical apparatus cabin 120 comprises, for example, an electromechanical apparatus cabin main body 122 and an energy retrieving apparatus 124. The energy retrieving apparatus 124 is, for example, a fan blade. The electromechanical apparatus cabin main body 122 is, for example, embedded in the body 110. However, in some embodiments, the electromechanical apparatus cabin main body 122 may also be disposed out of the body 110. The energy retrieving apparatus 124 is pivoted to the electromechanical apparatus cabin main body 122, and located in the throat portion 112b of the tube 112. Moreover, the end portion 114a of the first flow channel 114 communicating with the tube 112 is located at a front side or a back side of the energy retrieving apparatus 124. In other words, when the hydroelectric generator 100 is disposed in an ocean and ocean current flows into the throat portion 112b through the first tapering segment 112a in a flow direction D, the energy retrieving apparatus 124 may be located in an upstream region of the throat portion 112b or a downstream region of the throat portion 112b.

When the hydroelectric generator 100 is disposed in the ocean and an end of the tapering segment 112 having a larger sectional area faces the flow direction D of the ocean current, since the sectional area of the tapering segment 112 is tapered towards the middle segment of the tube 112, seawater in the tapering segment 112 is gradually accelerated and flows in to the throat portion 112b. The seawater entering the throat portion 112b pushes the energy retrieving apparatus 124 to rotate, so that the electromechanical apparatus cabin main body 122 generates electric current.

Moreover, when the ocean current flows in the flow direction D, the end portion 114a of the first flow channel 114 is in front of the energy retrieving apparatus 124, that is, in the upstream region of the throat portion 112b. Therefore, in this embodiment, the seawater can be poured into the throat portion 112b through the first flow channel 114, so as to destroy the boundary layer generated on the wall surface 110a, which forms the throat portion 112b, and, therefore, to reduce the resistance formed between the seawater flowing into the throat portion 112b and the wall surface 110a. Therefore, through the design of the first flow channel 114, the electricity generating efficiency of the hydroelectric generator 100 is improved.

Moreover, if the ocean current flows in a flow direction E opposite to the flow direction D, the end portion 114a of the first flow channel 114 is located in the downstream region of the throat portion 112b. Therefore, in this embodiment, the seawater in the throat portion 112b can be sucked out of the throat portion 112b through the first flow channel 114, so as to reduce a hydraulic pressure of the seawater located in the downstream region of the throat portion 112b, and, therefore, to increase the flow speed of the seawater entering the throat portion 112b. Therefore, through the first flow channel 114, whether the end portion 114a of the first flow channel 114 is in front of the energy retrieving apparatus 124 or in back of the energy retrieving apparatus 124, that is, when fluid flow through the throat portion 112b, whether the end portion 114a of the first flow channel 114 is located in an upstream region of the energy retrieving apparatus 124 or a downstream region of the energy retrieving apparatus 124, this embodiment can increase the electricity generating efficiency of the hydroelectric generator 100.

Figure 2:
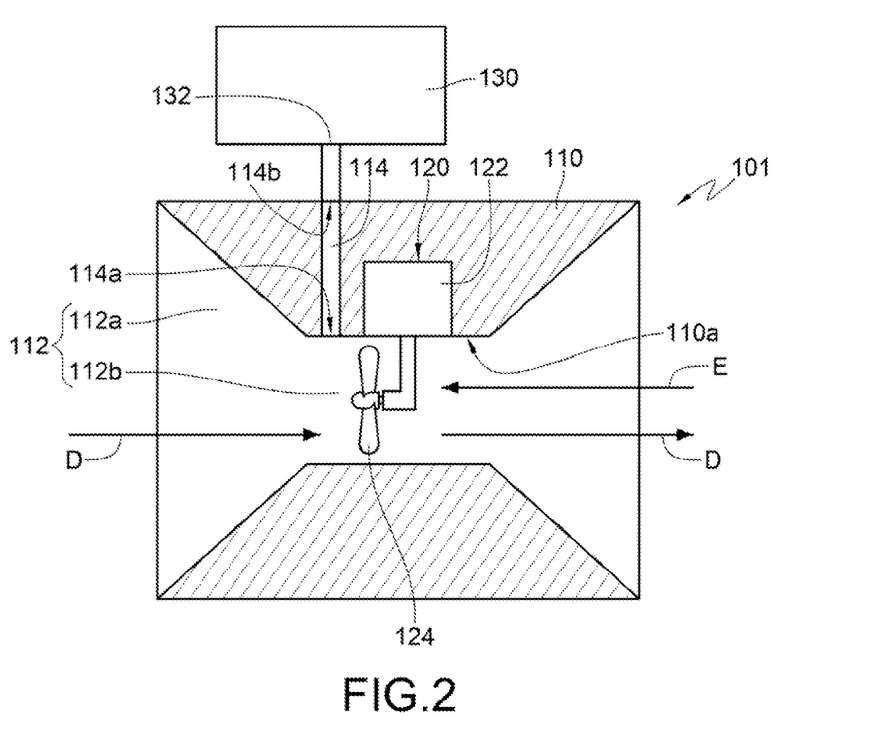
FIG. 2 is a schematic sectional view of an embodiment of a hydroelectric generator having a fluid transportation device.

FIG. 2 is a schematic sectional view of an embodiment of a hydroelectric generator 101 having a fluid transportation device 130, in which reference numerals the same as those in FIG. 1 represent the same or like elements. Referring to FIG. 2, the fluid transportation device 130 has a fluid transmission port 132 communicating with other end portion 114b of the first flow channel 114. In this embodiment, the fluid transportation device 130 is, for example, a pump, for pouring the seawater into the throat portion 112b through the first flow channel 114 or sucking the seawater in the throat portion 112b out of the throat portion 112b through the first flow channel 114, so as to increase the electricity generating efficiency of the hydroelectric generator.

Figure 3:
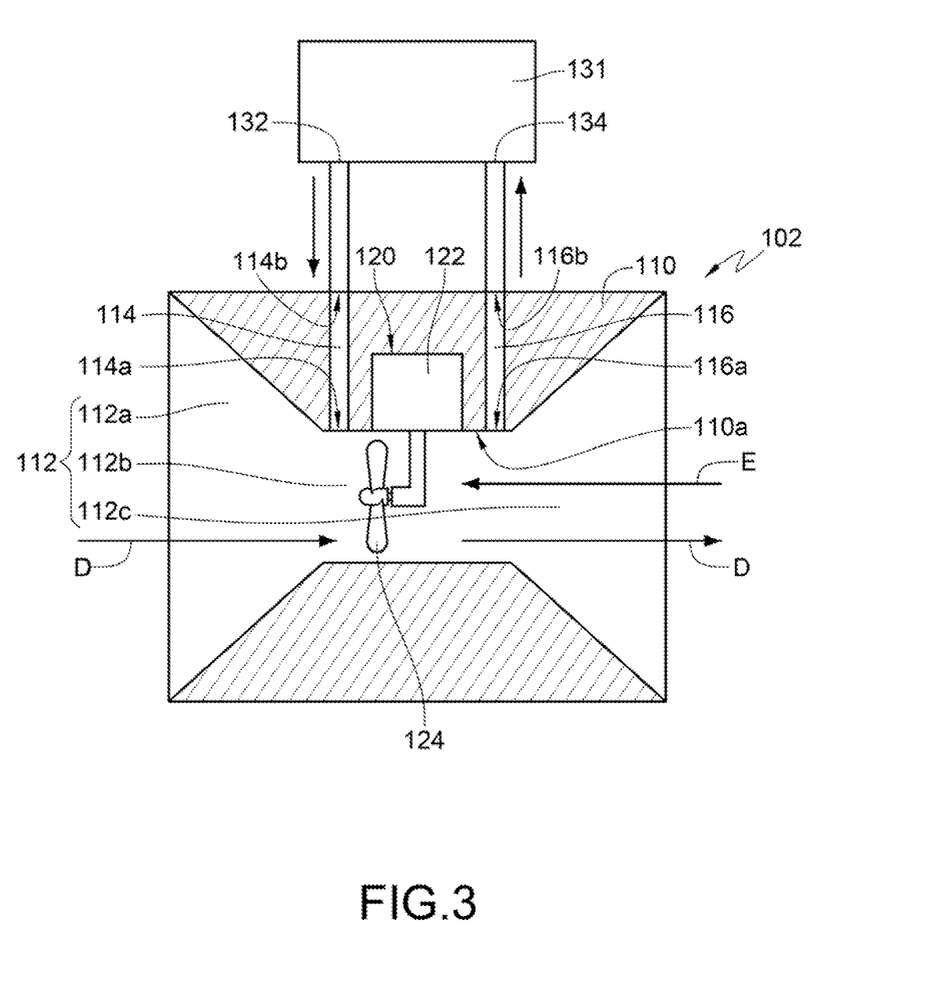
FIG. 3 is a schematic sectional view of an embodiment of another hydroelectric generator.

FIG. 3 is a schematic sectional view of an embodiment of another hydroelectric generator 102, in which reference numerals the same as those in FIG. 1 represent the same or like elements. Referring to FIG. 3, the hydroelectric generator 102 comprises a body 110 and an electromechanical apparatus cabin 120. The body 110 has a tube 112 penetrating the body 110, a first flow channel 114, and a second flow channel 116. The tube 112 has a first tapering segment 112a having a sectional area tapering from the outside of the tube 112 to the inside of the tube 112 and a throat portion 112b. The throat portion 112b communicates with the end of the first tapering segment 112a having a smaller sectional area. One end portion 114a of the first flow channel 114 is formed on a wall surface 110a of the throat portion 112b of the tube 112, so that the first flow channel 114 communicates with the tube 112. One end portion 116a of the second flow channel 116 is located on the wall surface 110a of the throat portion 112b, so that the second flow channel 116 communicates with the tube 112. The end portion 114a of the first flow channel 114 and the end portion 116a of the second flow channel 116 are located at a front side of the energy retrieving apparatus 124 and a back side of the energy retrieving apparatus 124, respectively. Moreover, this embodiment may further have a fluid transportation device 131. The fluid transportation device 131 has a fluid transmission port 132 and a fluid transmission port 134. The other end portion 114b of the first flow channel 114 communicates with the fluid transmission port 132, and the other end portion 116b of the second flow channel communicates with the other fluid transmission port 134. The fluid transportation device 131 is, for example, a pump. When an ocean current flows into the tube 112 in a flow direction D, the end portion 114a and the end portion 116a are located in an upstream region and a downstream region of the throat portion 112b, respectively. When in operation, the fluid transportation device 131 drives the fluid flowing through the fluid transmission port 132 in a direction opposite to the flowing direction of the fluid flowing through the fluid transmission port 134. More particularly, the fluid transportation device 131 drives seawater into the throat portion 112b through the fluid transmission port 132, so as to destroy the boundary layer of the seawater formed on the wall surface 110a. Furthermore, the fluid transportation device 131 sucks the seawater out of the throat portion 112b through the fluid transmission port 134, so as to form a negative pressure in a downstream region of the throat portion 112b. By both destroying the boundary layer of the seawater formed on the wall surface 110a and forming the negative pressure in the downstream region of the throat portion 112b, the hydroelectric generator of this embodiment can have a better electricity generating efficiency.

Figure 4:
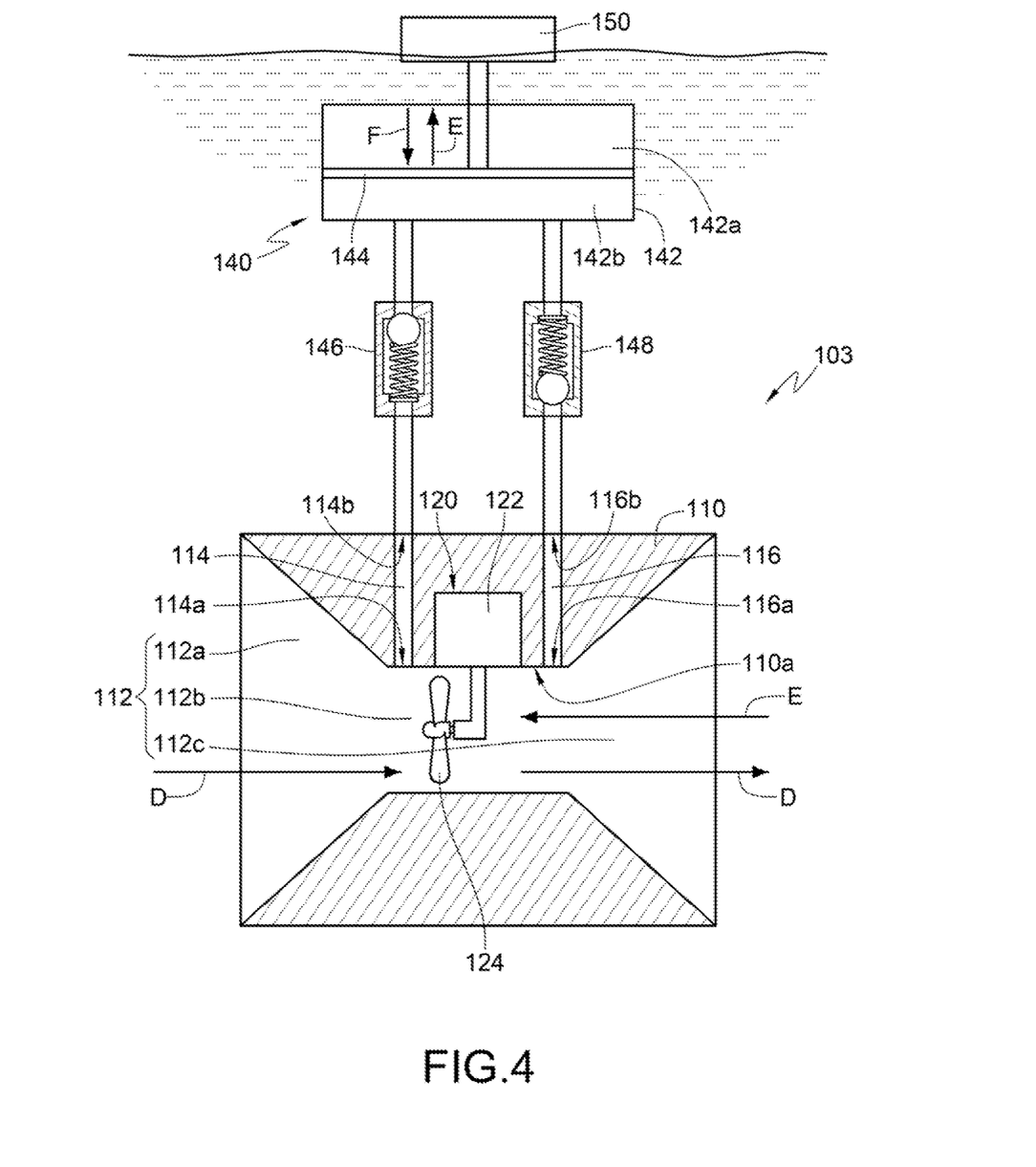
FIG. 4 is a schematic sectional view of an embodiment of yet another hydroelectric generator.

FIG. 4 is a schematic sectional view of an embodiment of another hydroelectric generator 103, in which reference numerals the same as those in FIG. 1 and FIG. 2 represent the same or like elements. In the above embodiments, the fluid transportation device 130 or the fluid transportation device 131 is a device requiring electricity energy supply, for example, a pump. However, in this embodiment of FIG. 4 or some embodiments, the hydroelectric generator 103 adopts, for example, a fluid transportation device 140 not requiring electricity power supply.

Referring to FIG. 4, the fluid transportation device 140 comprises a hydraulic cylinder 142, a reciprocating element 144, a first non-return module 146, and a second non-return module 148. The hydraulic cylinder 142 has a chamber. The reciprocating element 144 is located in the chamber of the hydraulic cylinder 142 in a manner of being capable of reciprocally moving with respect to the chamber, so as to separate the chamber into a first compartment 142a and a second compartment 142b. Accordingly, the volume change rate of the first compartment 142a is adversely proportional to that of the second compartment 142b. For example, when the reciprocating element 144 moves towards a glide direction F with respect to the hydraulic cylinder 142, the volume of the second compartment 142b is gradually decreased. On the contrary, the volume of the first compartment 142a is gradually increased.

The first non-return module 146 is, for example, a check valve. The first non-return module 146 is located between the second compartment 142b and the first flow channel 114, so as to allow seawater to flow from the second compartment 142b into the tube 112 through the first flow channel 114, but inhibit the seawater from flowing from the tube 112 into the second compartment 142b through the first flow channel 114.

The second non-return module 148 is, for example, the check valve. The second non-return module 148 is located between the second compartment 142b and the second flow channel 116, so as to allow the seawater to flow from the tube 112 into the second compartment 142b through the second flow channel 116, but inhibit the seawater from flowing from the second compartment 142b into the tube 112 through the second flow channel 116.

In this embodiment and some the embodiments, the fluid transportation device 140 comprises, for example, a buoy 150 connected to the reciprocating element 144. Therefore, when the hydroelectric generator 103 is placed in an ocean and the buoy 150 floats on the ocean surface, the buoy 150 is driven by waves to push the reciprocating element 144, so that the reciprocating element 144 is reciprocated with respect to the hydraulic cylinder 142.

When the buoy 150 is driven by the waves to push the reciprocating element 144 to move towards the glide direction F and an ocean current enters the throat portion 112b in the flow direction D, since the volume of the second compartment 142b is gradually decreased, the seawater in the second compartment 142b flows into an upstream region of the throat portion 112b through the first non-return module 146 and the first flow channel 114 in turn to destroy the boundary layer of the seawater formed on a wall surface 110a.

Furthermore, when the buoy 150 is driven by the waves to push the reciprocating element 144 to move towards a glide direction E opposite to the glide direction F and the ocean current enters the throat portion 112b in the flow direction D, since the volume of the second compartment 142b is gradually increased, the seawater in a downstream region of the throat portion 112b is sucked into the second compartment 142b through the second flow channel 116 and the second non-return module 146 to reduce a hydraulic pressure of the seawater in a downstream region of the throat portion 112b.

Since the fluid transportation device 140 in this embodiment drives the reciprocating element 140 through the flow of the seawater in the ocean, compared with the pump, the fluid transportation device 140 does not need to use additional energy sources (such as electrical energy). Therefore, the hydroelectric generator of this embodiment is more environmental friendly.

Figure 5:
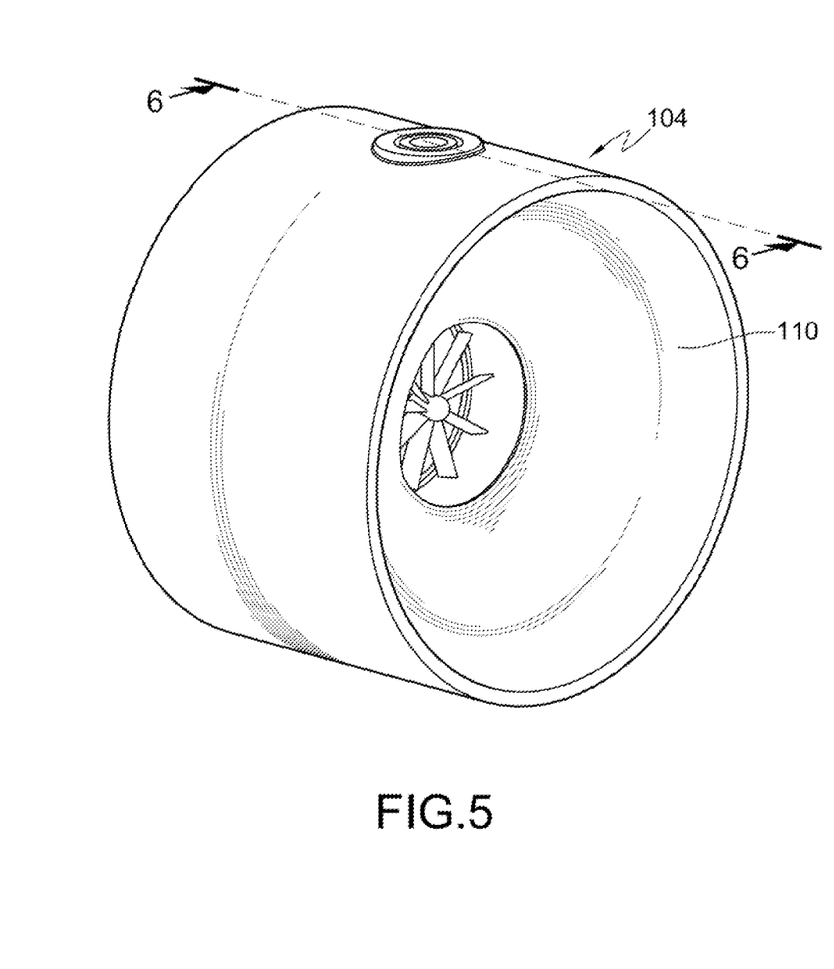
FIG. 5 is a schematic sectional view of an embodiment of still another hydroelectric generator.
Figure 6:
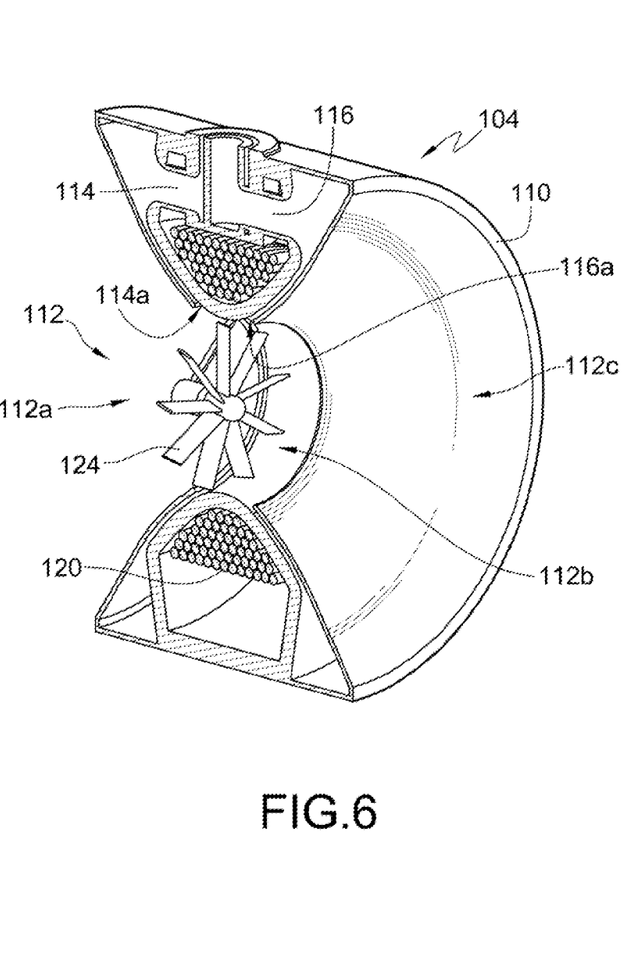
FIG. 6 is a schematic sectional view taken along a section line 6-6 of FIG. 5.
Figure 7:
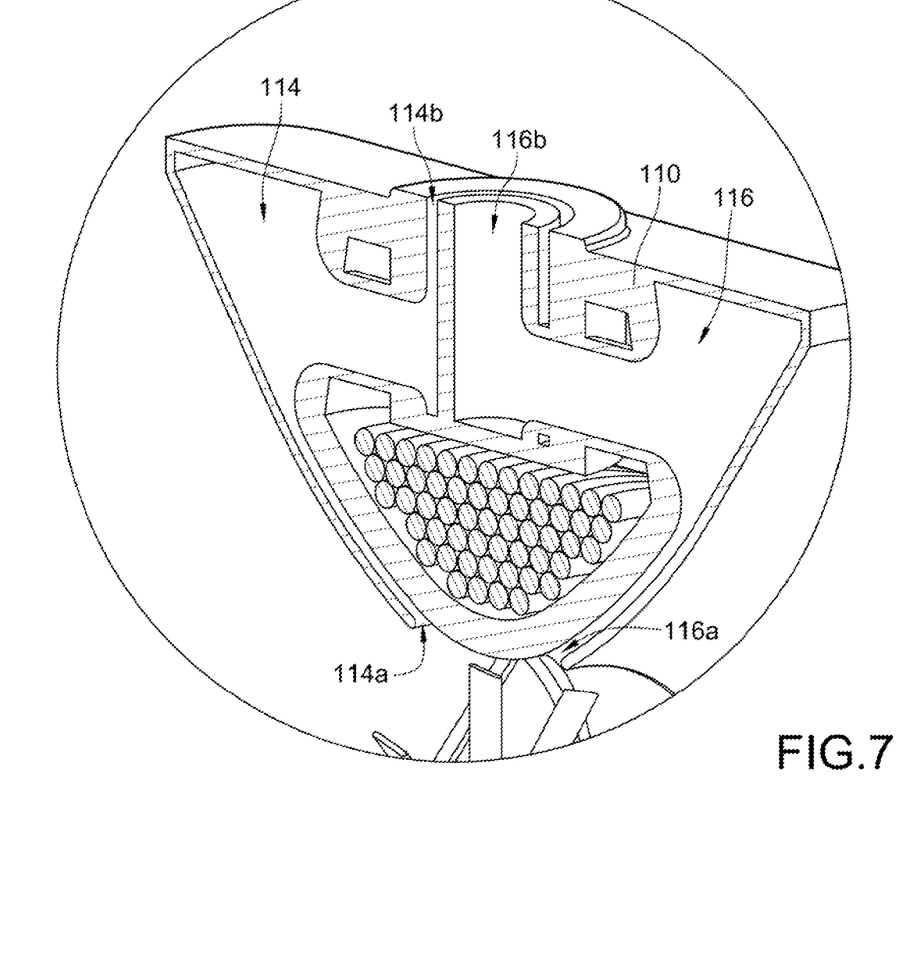
FIG. 7 is a schematic partially enlarged view of FIG. 6.
Figure 8:
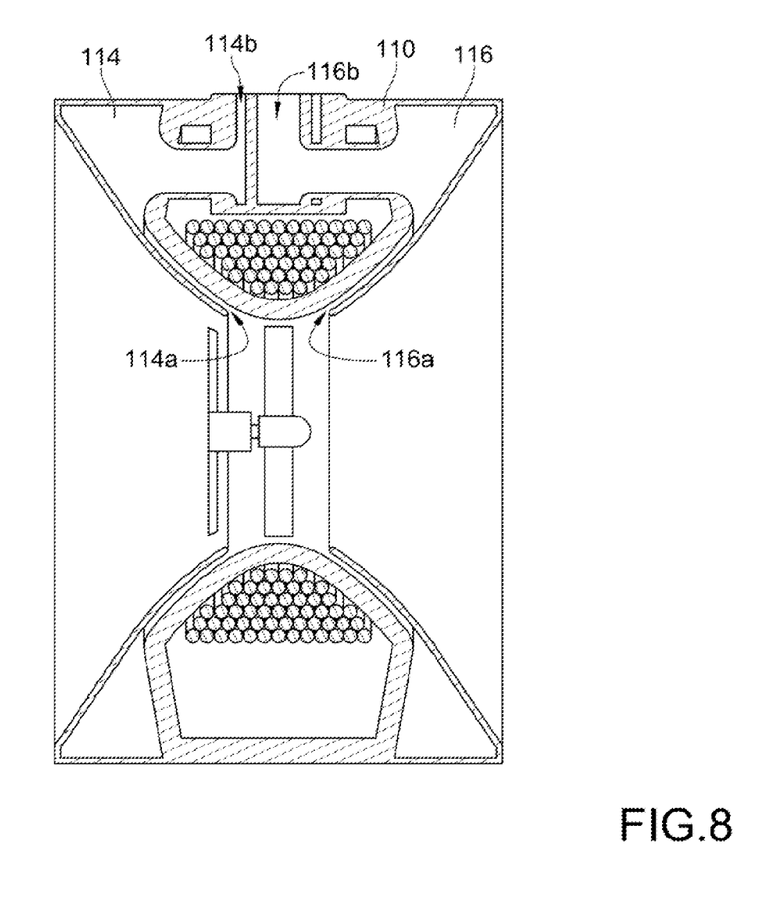
FIG. 8 is a schematic plan view of a section plane of FIG. 6.

FIG. 5 is a schematic sectional view of an embodiment of another hydroelectric generator 104. FIG. 6 is a schematic sectional view obtained along a section line 6-6 of FIG. 5. FIG. 7 is a schematic partially enlarged view of FIG. 6. FIG. 8 is a schematic plan view of a section plane of FIG. 6. Reference numerals the same as those in FIG. 1 and FIG. 2 represent the same or like elements.

Referring to FIG. 5 to FIG. 8, the hydroelectric generator 104 comprises a body 110 and an electromechanical apparatus cabin 120. The body 110 has a tube 112 penetrating the body 110, a first flow channel 114, and a second flow channel 116. The tube 112 has a first tapering segment 112a having a sectional area tapering from the outside of the tube 112 to the inside of the tube 112 and a throat portion 112b. The throat portion 112b communicates with the end of the first tapering segment 112a having a smaller sectional area. One end portion 114a of the first flow channel 114 is located on a wall surface 110a forming the throat portion 112b of the tube 112, so that the first flow channel 114 communicates with the tube 112. One end portion 116a of the second flow channel 116 is located on the wall surface 110a forming the throat portion 112b of the tube 112, so that the second flow channel 116 communicates with the tube 112. The end portion 114a of the first flow channel 114 and the end portion 116a of the second flow channel 116 are located at a front side of the energy retrieving apparatus 124 and a back side of the energy retrieving apparatus 124, respectively.

Figure 9:
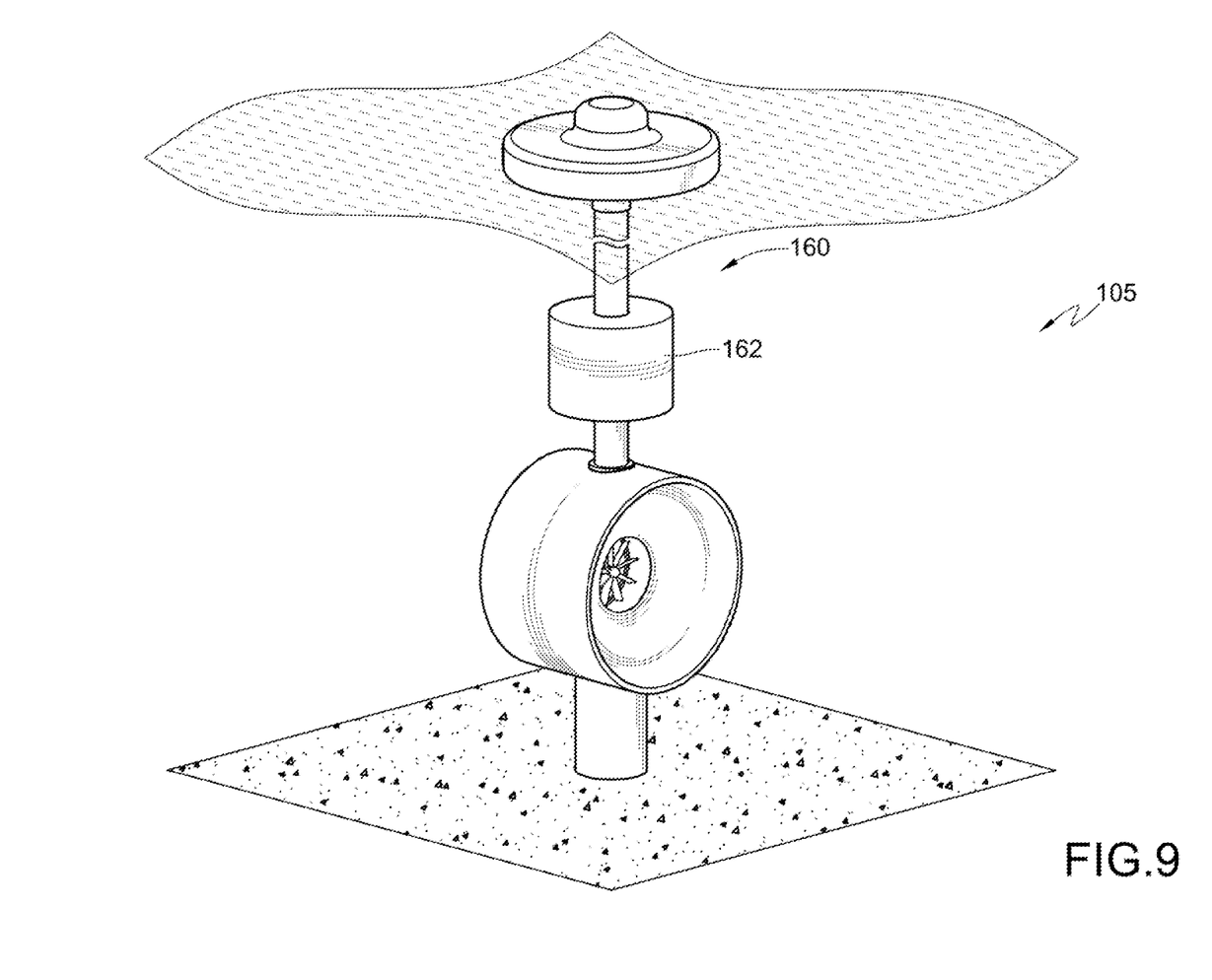
FIG. 9 is a three-dimensional view of an embodiment of a hydroelectric generator having a fluid transportation device.
Figure 10:
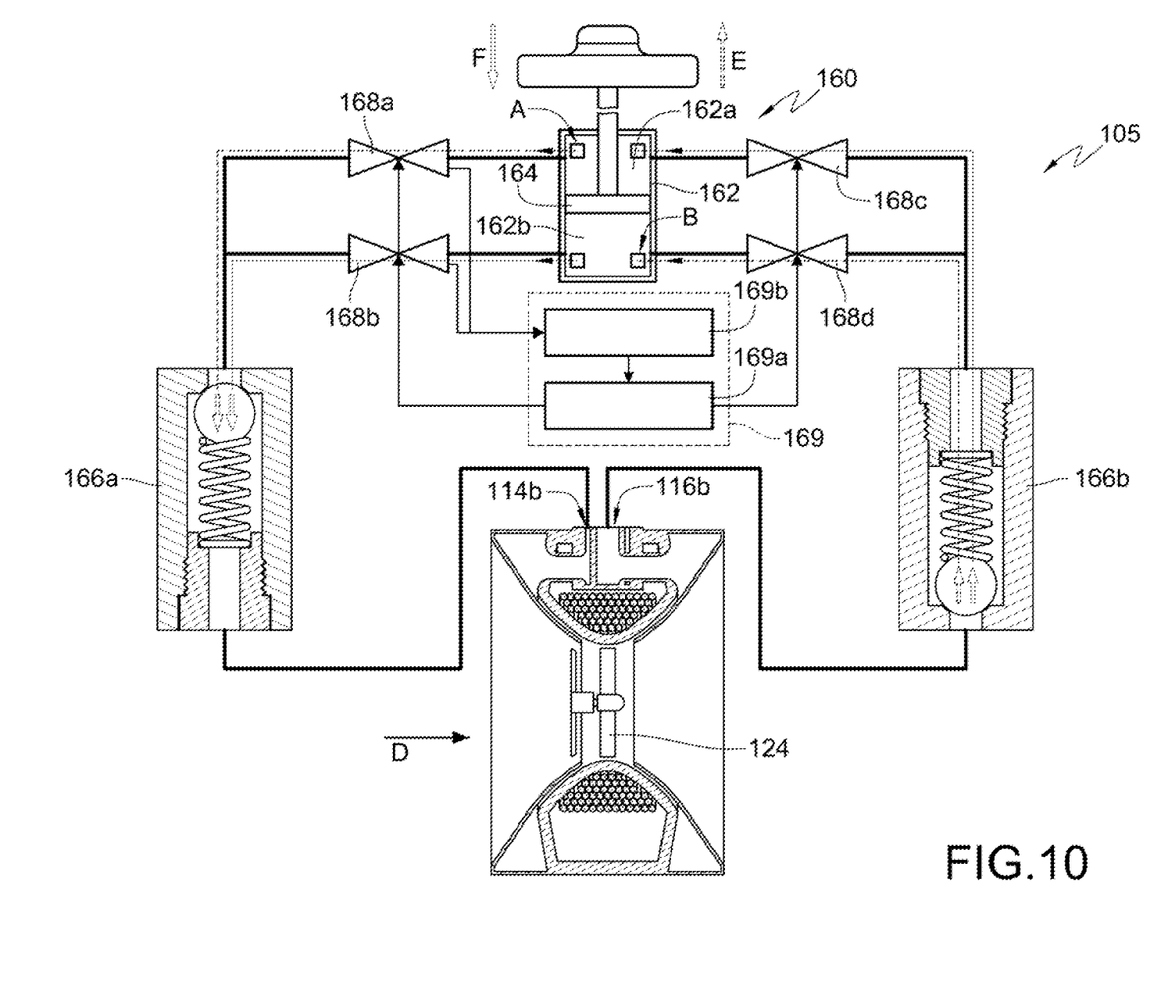
FIG. 10 is a schematic diagram of a control manner of the hydroelectric generator of FIG. 9.

FIG. 9 is a three-dimensional view of an embodiment of a hydroelectric generator 105 having a fluid transportation device 160. FIG. 10 is a schematic diagram of a control manner of the hydroelectric generator 105 of FIG. 9. Referring to FIG. 9 and FIG. 10, it is noted that, for the convenience of illustration, in FIG. 10, a first non-return module 166a, a second non-return module 166b, a first valve 168a, a second valve 168b, a third valve 168c, and a fourth valve 168d are drawn outside a hydraulic cylinder 162, but in the embodiment of the disclosure, theses elements can not only be installed outside the hydraulic cylinder 162. However, in some embodiment, they are assembled in the hydraulic cylinder 162. In FIG. 9 and FIG. 10, reference numerals the same as those in FIG. 1 and FIG. 2 represent the same or like elements.

The fluid transportation device 160 comprises the hydraulic cylinder 162, a reciprocating element 164, the first non-return module 166a, the second non-return module 166b, the first valve 168a, the second valve 168b, the third valve 168c, the fourth valve 168d, and a controller 169.

The hydraulic cylinder 162 has a chamber. The reciprocating element 164 is located in the chamber of the hydraulic cylinder 162, and the reciprocating element 164 is disposed in the chamber in a manner of being capable of reciprocally moving with respect to the chamber, so as to separate the chamber into a first compartment 162a and a second compartment 162b. Accordingly, the volume change rate of the first compartment 162a is adversely proportional to that of the second compartment 162b. The other end portion 114b of the first flow channel 114 communicates with the first compartment 162a and the second compartment 162b through the first non-return module 166a. The first non-return module 166a is, for example, a check valve, so as to allow seawater to flow from the first compartment 162a or the second compartment 162b into the tube 112 through the first flow channel 114, but inhibit the seawater from flowing from the tube 112 into the first compartment 162a or the second compartment 162b through the first flow channel 114.

The other end portion 116b of the second flow channel 116 communicates with the first compartment 162a and the second compartment 162b through the second non-return module 166b. The second non-return module 166b is, for example, a check valve, so as to allow the seawater to flow from tube 112 into the first compartment 162a or the second compartment 162b through the second flow channel 116, but inhibit the seawater from flowing from the first compartment 162a or the second compartment 162b into the tube 112 through the second flow channel 116.

The first valve 168a is between the first non-return module 166a and the first compartment 162a. The second valve 168b is between the first non-return module 166a and the second compartment 162b. The third valve 168c is between the second non-return module 166b and the first compartment 162a. The fourth valve 168d is between second non-return module 166b and the second compartment 162b.

The fluid transportation device 160 comprises, for example, a buoy 150 connected to the reciprocating element 164. Therefore, when the hydroelectric generator 104 is placed in an ocean and the buoy 150 floats on the surface of the ocean, the buoy 150 is driven by waves to push the reciprocating element 164, so that the reciprocating element 164 is moved back and forth with respect to the hydraulic cylinder 162.

The controller 169 is electrically connected to the first valve 168a, the second valve 168b, the third valve 168c, and the fourth valve 168d. The controller 169 switches the first valve 168a, the second valve 168b, the third valve 168c, and the fourth valve 168d between a first state and a second state according to the volume change of the first compartment. In the first state, the first valve 168a and the fourth valve 168d are closed, and the second valve 168b and the third valve 168c are opened. In the second state, the first valve 168a and the fourth valve 168d are opened, and the second valve 168b and the third valve 168c are closed. That a valve is opened means fluid is capable of passing through the valve; that a valve is closed means passage of the valve for fluid to pass through is blocked off.

More particularly, when the buoy 150 is driven by the waves to push the reciprocating element 164 to move towards a glide direction F and an ocean current enters the throat portion 112b in a flow direction D, the controller 169 switches the first valve 168a, the second valve 168b, the third valve 168c, and the fourth valve 168d to the first state. Since the volume of the first compartment 162a is gradually increased and the volume of the second compartment 162b is gradually decreased at this time, the seawater in the second compartment 162b flows into an upstream region of the throat portion 112b through the second valve 168b, the first non-return module 166a, and the first flow channel 114 in turn to destroy the boundary layer of the seawater formed on a wall surface 110a; at the same time, the seawater in a downstream region of the throat portion 112b is sucked into the first compartment 162a through the second flow channel 116, the second non-return module 166b, and the third valve 168c in turn to reduce a hydraulic pressure of the seawater in the downstream region of the throat portion 112b.

When the buoy 150 is driven by the waves to push the reciprocating element 164 to move towards a glide direction E opposite to the glide direction F and the ocean current enters the throat portion 112b in the flow direction D, the controller 169 switches the first valve 168a, the second valve 168b, the third valve 168c, and the fourth valve 168d to the second state. Since the volume of the first compartment 162a is gradually decreased and the volume of the second compartment 162b is gradually increased at this time, the seawater in the first compartment 162a flows into the upstream region of the throat portion 112b through the first valve 168a, the first non-return module 166a, and the first flow channel 114 in turn to destroy the boundary layer of the seawater formed on the wall surface 110a; at the same time, the seawater in the downstream region of the throat portion 112b is sucked into the second compartment 162b through the second flow channel 116, the second non-return module 166b, and the fourth valve 168d in turn to reduce the hydraulic pressure of the seawater in the downstream region of the throat portion 112b.

Therefore, compared with the embodiment in FIG. 4, whether in a travel route of the reciprocating element 164 increasing the volume of the first compartment 162a or in a travel route of the reciprocating element 164 decreasing the volume of the first compartment 162a, this embodiment can transport the seawater into the upstream region of the throat portion 112b and suck the seawater out of the downstream region of the throat portion 112b. Therefore, this embodiment has a better electricity generating efficiency.

In some embodiments, the controller 169 comprises, for example, a valve control system 169a and a flow rate sensing system 169b. The flow rate sensing system 169 detects, for example, the flow rate at a joint A between the hydraulic cylinder 162 and the first valve 168a and the flow rate at a joint B between the hydraulic cylinder 162 and the fourth valve 168d. If the flow rate at the joint A having flow direction from the hydraulic cylinder 162 to the first valve 168a is defined as a positive value and the flow rate at the joint B having flow direction from the fourth valve 168d to the hydraulic cylinder 162 is defined as a positive value, when the flow rate at the joint A is changed form the positive value to a negative value and the flow at the joint B is changed form a negative value to the positive value, the valve control system 169a classifies such situation as that the reciprocating element 164 begins to change motion direction from the glide direction E to the glide direction F. Then, the valve control system 169a switches the first valve 168a, the second valve 168b, the third valve 168c, and the fourth valve 168d to the first state. Furthermore, when the flow at the joint A is changed form the negative value to the positive value and the flow at the joint B is changed form the positive value to the negative value, the valve control system 169a classifies such situation as that the reciprocating element 164 begins to change motion direction from the glide direction F to the glide direction E. Then the valve control system 169a switches the first valve 168a, the second valve 168b, the third valve 168c, and the fourth valve 168d to the second state.

Figure 11:
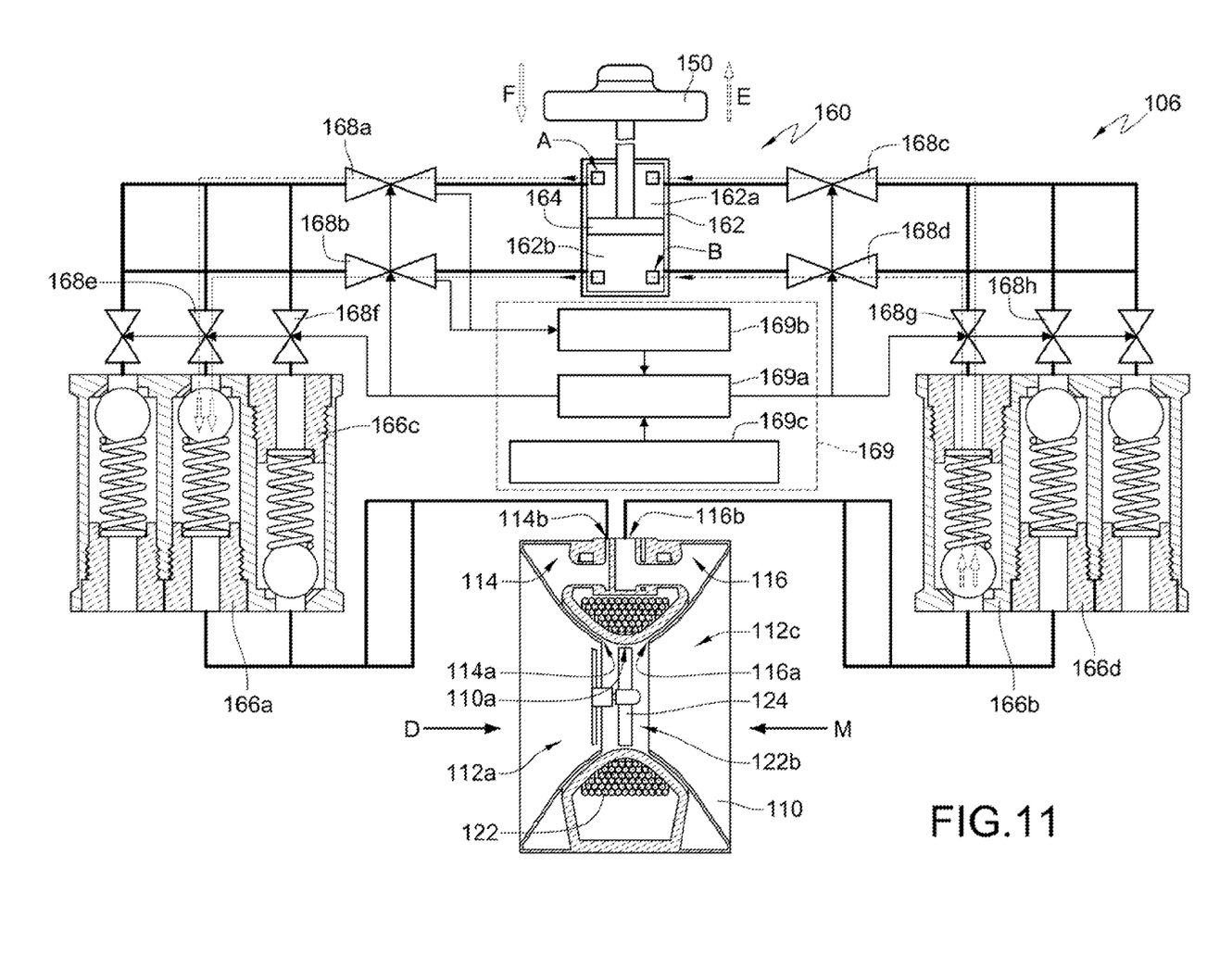
FIG. 11 is a schematic sectional view of an embodiment of another hydroelectric generator.

FIG. 11 is a schematic sectional view of an embodiment of another hydroelectric generator 106. Referring to FIG. 11, the hydroelectric generator 106 is similar to the hydroelectric generator 105, and the same reference numerals represent the same or like elements. The difference between the hydroelectric generator 106 and the hydroelectric generator 105 lies in that, the hydroelectric generator 106 further comprises a third non-return module 166c and a fourth non-return module 166d. Moreover, the tube 112 further has a second tapering segment 112c. The throat portion 112b is located between the first tapering segment 112a and the second tapering segment 112c. Moreover, the end of the second tapering segment 112c having smaller sectional area communicates with the throat portion 112b.

The third non-return module 166c is, for example, a check valve. The other end portion 114b of the first flow channel 114 further communicates with the first compartment 162a and the second compartment 162b through the third non-return module 166c, so as to allow seawater to flow from the tube 112 into the first compartment 162a or the second compartment 162b through the first flow channel 114, but inhibit the seawater from flowing from the first compartment 162a or the second compartment 162b into the tube 112 through the first flow channel 114.

The fourth non-return module 166d is, for example, a check valve. The other end portion 116b of the second flow channel 116 communicates with the first compartment 162a and the second compartment 162b through the fourth non-return module 166d, so as to allow the seawater to flow from the first compartment 162a or the second compartment 162b into the tube 112 through the second flow channel 116, but inhibit the seawater from flowing from the tube 112 into the first compartment 162a or the second compartment 162b through the second flow channel 116.

The first valve 168a enables the first non-return module 166a and the third non-return module 166c to communicate with the first compartment 162a. The second valve 168b enables the first non-return module 166a and the third non-return module 166c to communicate with the second compartment 162b. The third valve 168c enables the second non-return module 166b and the fourth non-return module 166d to communicate with the first compartment 162a. The fourth valve 168d enables the second non-return module 166b and the fourth non-return module 166d to communicate with the second compartment 162b.

Furthermore, the hydroelectric generator 106 further comprises: a fifth valve 168e between the first non-return module 166a and the first valve 168a and between the first non-return module 166a and the second valve 168b; a sixth valve 168f between the third non-return module 166c and the first valve 168a and between the third non-return module 166c and the second valve 168b; a seventh valve 168g between the second non-return module 166b and the second valve 168b and between the second non-return module 166b and the third valve 168c; and a eighth valve 168h between the fourth non-return module 166d and the second valve 168b and between the fourth non-return module 166d and the third valve 168c.

In addition to the valve control system 169a and the flow rate sensing system 169b, in this and some embodiments, the controller 169 further comprises an ocean current flow direction sensing system 169c. The ocean current flow direction sensing system 169c is used to sense the flow direction of an ocean current.

When the ocean current flow direction sensing system 169c detects that the ocean current enters the throat portion 122b in the flow direction D, the valve control system 169a opens both the fifth valve 168e and the seventh valve 168g and closes both the sixth valve 168f and the eighth valve 168h, so as to pour the seawater into an upstream region of the throat portion 122b through the first flow channel 114, and suck seawater in a downstream region of the throat portion 122b out through the second flow channel 116.

However, when the ocean current flow direction sensing system 169c detects that the ocean current enters the throat portion 122b in a flow direction M opposite to the flow direction D, the valve control system 169a opens both the sixth valve 168f and the eighth valve 168h and closes both the fifth valve 168e and the seventh valve 168g, so as to pour the seawater into the upstream region of the throat portion 122b through the second flow channel 116, and suck the seawater in the downstream region of the throat portion 122b out through the first flow channel 114. Therefore, when the direction of the ocean current is changed, the hydroelectric generator 106 in this embodiment can adjust the liquid flow direction in the first flow channel 114 and the second flow channel 116, so that the hydroelectric generator 106 maintains a good electricity generating efficiency.

In the above embodiments, the seawater can be poured into the upstream region of the throat portion or the seawater in the downstream region of the throat portion can be sucked out of the throat portion so the hydroelectric generators have a better electricity generating efficiency.

What is claimed is:

1. A hydroelectric generator, comprising:
  a body comprising a tube penetrating the body and a first flow channel, one end of the first flow channel being at an outer surface of the body, and the other end of the first flow channel being at an inner surface of the body, and the tube comprising:
    a first tapering segment with a sectional area tapered from an outside of the tube to an inside of the tube;
    a throat portion communicating with an end of the first tapering segment having smaller sectional area; one end of the first flow channel being located on a wall surface of the throat portion of the tube for communicating the first flow channel with the tube and for either guiding a fluid to flow into the tube from the first flow channel or guiding a fluid to flow out of the body from the throat portion; and
    a second flow channel, one end of the second flow channel is located on the wall surface of the throat portion of the tube for communicating the second flow channel with the tube;
  an electromechanical apparatus cabin comprising an energy retrieving apparatus disposed in the throat portion of the tube, and the ends of the first flow channel and the second flow channel located on the wall surface of the throat portion of the tube are in front and in back of the energy retrieving apparatus respectively for guiding the fluid to flow into the tube from the first flow channel and for guiding the fluid in the throat portion to flow out of the body;
  a fluid transportation device having two fluid transmission ports, the other end of the first flow channel communicating with one of the fluid transmission ports, the other end of the second flow channel communicating with the other fluid transmission port, and when being in operation, the fluid transportation device guiding the fluid to flow into the tube from the first flow channel and guiding the fluid located in the throat portion to flow out of the body through the second flow channel, and the fluid transportation device comprises:
    a hydraulic cylinder having a chamber;
    a reciprocating element disposed in the chamber in a manner of being capable of reciprocating moving with respect to the chamber for separating the chamber into a first compartment and a second compartment, so that the volume change rate of the first compartment is opposite to the volume change rate of the second compartment;
    a first non-return module located between the hydraulic cylinder and the first flow channel for preventing the fluid from flowing from the tube into the hydraulic cylinder through the first flow channel; and
    a second non-return module located between the hydraulic cylinder and the second flow channel for preventing fluid from flowing from the hydraulic cylinder into the tube through the second flow channel; and
  a buoy connected to the reciprocating element, wherein the reciprocating element is disposed between the buoy and the body.

2. The hydroelectric generator according to claim 1, wherein the fluid transportation device comprises:
  a first valve between the first non-return module and the first compartment;

a second valve between the first non-return module and the second compartment;

a third valve between the second non-return module and the first compartment;

a fourth valve between the second non-return module and the second compartment; and a controller electrically connected to the first valve, the second valve, the third valve, and the fourth valve for switching the first valve, the second valve, the third valve, and the fourth valve between a first state and a second state according to the volume change of the first compartment, wherein in the first state, the first valve and the fourth valve are closed and the second valve and the third valve are opened, and in the second state, the first valve and the fourth valve are opened and the second valve and the third valve are closed.

3. The hydroelectric generator according to claim 1, wherein the tube comprises a second tapering segment, the throat portion is located between the first tapering segment and the second tapering segment, and the end of the second tapering segment having smaller sectional area communicates with the throat portion.

4. A hydroelectric, generator, comprising:

a body comprising a tube penetrating the body and a first flow channel, one end of the first flow channel being at an outer surface of the body, and the other end of the first flow channel being at an inner surface of the body, and the tube comprising:

a first tapering segment with a sectional area tapered from an outside of the tube to an inside of the tube;

a throat portion communicating with an end of the first tapering segment having smaller sectional area; one end of the first flow channel being located on a wall surface of the throat portion of the tube for communicating the first flow channel with the tube and for either guiding a fluid to flow into the tube from the first flow channel or guiding a fluid to flow out of the body from the throat portion; and a second flow channel, one end of the second flow channel is located on the wall surface of the throat portion of the tube for communicating the second flow channel with the tube;

an electromechanical apparatus cabin comprising an energy retrieving apparatus disposed in the throat portion of the tube, and the ends of the first flow channel and the second flow channel located on the wall surface of the throat portion of the tube are in front and in back of the energy retrieving apparatus respectively for guiding the fluid to flow into the tube from the first flow channel and for guiding the fluid in the throat portion to flow out of the body;

a fluid transportation device having two fluid transmission ports, the other end of the first flow channel communicating with one of the fluid transmission ports, the other end of the second flow channel communicating with the other fluid transmission port, and when being in operation, the fluid transportation device guiding the fluid to flow into the tube from the first flow channel and guiding the fluid located in the throat portion to flow out of the body through the second flow channel, and in the fluid transportation device comprises:

a hydraulic cylinder having a chamber;

a reciprocating element disposed in the chamber in a manner of being capable of reciprocally moving with respect to the chamber for separating the chamber into a first compartment and a second compartment having; so that the volume change rate of the first compartment is opposite to that of the second compartment;

a first non-return module through which the other end of the first flow channel communicates with the first compartment and the second compartment;

a second non-return module through which the other end of the second flow channel communicates with the first compartment and the second compartment;

a first valve between the first non-return module and the first compartment;

a second valve between the first non-return module and the second compartment;

a third valve between the second non-return module and the first compartment;

a fourth valve between the second non-return module and the second compartment; and a controller electrically connected to the first valve, the second valve, the third valve, and the fourth valve for switching the first valve, the second valve, the third valve, and the fourth valve between a first state and a second state according to the volume change of the first compartment, wherein in the first state; the first valve and the fourth valve are closed and the second valve and the third valve are opened, and in the second state, the first valve and the fourth valve are opened and the second valve and the third valve are closed; and a buoy connected to the reciprocating element, wherein the reciprocating element is disposed between the buoy and the body.

5. The hydroelectric generator according to claim 4, wherein the tube comprises a second tapering segment, the throat portion is located between the first tapering segment and the second tapering segment, and the end of the second tapering segment having smaller sectional area communicates with the throat portion.

* * * * *